US011070624B2

(12) United States Patent
Yuan et al.

(10) Patent No.: US 11,070,624 B2
(45) Date of Patent: Jul. 20, 2021

(54) HYBRID WIRELESS SENSOR NETWORK ARCHITECTURE FOR FLUID DELIVERY AND DISTRIBUTION SYSTEMS (71) Applicant: EATON INTELLIGENT POWER LIMITED, Dublin (IE)

(72) Inventors: QingHui Yuan, Edina, MN (US); Jeffrey Lowinger, Cleveland, OH (US)

(73) Assignee: EATON INTELLIGENT POWER LIMITED, Dublin (IE)

(*) Notice: Subject to any disclaimer, the term of this patent is extended or adjusted under 35 U.S.C. 154(b) by 0 days.

(21) Appl. No.: 16/482,757

(22) PCT Filed: Feb. 1, 2018

(86) PCT No.: PCT/US2018/016466
§ 371 (c)(1),
(2) Date: Aug. 1, 2019

(87) PCT Pub. No.: WO2018/144741
PCT Pub. Date: Aug. 9, 2018

(65) Prior Publication Data
US 2019/0356740 A1 Nov. 21, 2019

Related U.S. Application Data
(60) Provisional application No. 62/453,393, filed on Feb. 1, 2017.

(51) Int. Cl.
H04L 29/08 (2006.01)
G05D 7/06 (2006.01)
H04Q 9/00 (2006.01)
(52) U.S. Cl.
CPC ......... *H04L 67/125* (2013.01); *G05D 7/0617* (2013.01); *H04Q 9/00* (2013.01);
(Continued)

(58) Field of Classification Search
CPC ...... H04L 67/125; G05D 7/0617; H04Q 9/00; H04Q 2209/00; H04Q 2209/10;
(Continued)

(56) References Cited

U.S. PATENT DOCUMENTS 8,302,496 B2 * 11/2012 Furey ................... G01D 11/245
73/866.5
8,631,829 B1 1/2014 Bennett
(Continued)

FOREIGN PATENT DOCUMENTS

WO 2014/164785 A1 10/2014

OTHER PUBLICATIONS

International Search Report and Written Opinion of the International Searching Authority for International Patent Application No. PCT/US2018/016466 dated Jun. 4, 2018, 11 pages.
(Continued)

*Primary Examiner* — Franklin D Balseca
(74) *Attorney, Agent, or Firm* — Merchant & Gould P.C.

(57) ABSTRACT

The present disclosure describes a hybrid, wireless sensor network architecture for monitoring, operating, controlling, or maintaining a fluid delivery and distribution system. The architecture includes intelligent fittings locatable at almost any location within the system and that are configured with sensor modules to make measurements of characteristics of a fluid passing therethrough or of component parameters, and with wireless communication modules to wireless communicate the measurements. The intelligent fittings may be used, via strategic location, to convert unintelligent components of the system into intelligent components at a cost lower than that required to replace the unintelligent components with intelligent components. The intelligent fittings may also replace unintelligent fittings to provide supplemental data corresponding to fluid characteristics at desired
(Continued)

locations of a fluid delivery and distribution system. The architecture further includes a digital twin of a hybrid, wireless sensor network that may downloaded to controllers for use.

17 Claims, 4 Drawing Sheets

(52) U.S. Cl.
CPC ... *H04Q 2209/40* (2013.01); *H04Q 2209/823* (2013.01); *H04Q 2209/886* (2013.01)

(58) Field of Classification Search
CPC .......... H04Q 2209/40; H04Q 2209/80; H04Q 2209/82; H04Q 2209/823; H04Q 2209/826; H04Q 2209/84; H04Q 2209/886
See application file for complete search history.

(56) References Cited

U.S. PATENT DOCUMENTS

| | | | |
|---|---|---|---|
| 9,848,821 B2* | 12/2017 | Rule | A61M 5/1723 |
| 10,261,523 B2* | 4/2019 | Khabbaz | A01G 25/162 |
| 10,362,739 B2* | 7/2019 | Ersavas | A01G 25/167 |
| 10,590,752 B2* | 3/2020 | Al-Gouhi | E21B 34/06 |
| 2002/0117214 A1 | 8/2002 | Tucker et al. | |
| 2003/0135335 A1 | 7/2003 | Grumstrup et al. | |
| 2007/0192046 A1 | 8/2007 | Hairston | |
| 2011/0308259 A1 | 12/2011 | Wray et al. | |
| 2015/0220089 A1 | 8/2015 | Orr et al. | |
| 2016/0102796 A1 | 4/2016 | Ciccone et al. | |

OTHER PUBLICATIONS

Supplementary European Search Report, EP 18 74 8589, dated Oct. 26, 2020, 8 pages.

\* cited by examiner

HYBRID WIRELESS SENSOR NETWORK ARCHITECTURE FOR FLUID DELIVERY AND DISTRIBUTION SYSTEMS

CROSS-REFERENCE TO RELATED APPLICATION

This application is a National Stage Application of PCT/US2018/016466, filed on Feb. 1, 2018, which claims the benefit of U.S. Patent Application Ser. No. 62/453,393, filed on Feb. 1, 2017, the disclosures of which are incorporated herein by reference in their entireties. To the extent appropriate, a claim of priority is made to each of the above disclosed applications.

FIELD OF THE INVENTION

The present invention relates generally to the field of fluid delivery and distribution systems and, more particularly, to sensor networks for controlling and managing fluid delivery distribution systems.

BACKGROUND

Fluid delivery and distribution systems take on many forms and are found in a wide variety of industrial, commercial, and residential applications. For example, hydraulic fluid delivery and distribution systems are found in construction and other heavy equipment, aircraft, ships, vehicles, manufacturing equipment, industrial robots, and elevators. In another example, fuel delivery and distribution systems are found in fuel pipeline infrastructure, fuel storage facilities, fueling stations, construction and heavy equipment, aircraft, ships, and vehicles. In still another example, chemical delivery and distribution systems are found in petrochemical manufacturing plants, steel mills, paper mills, food manufacturing plants, and hospitals. In yet another example, water delivery and distribution systems are found in water treatment facilities, water pipeline infrastructure, manufacturing plants, buildings, and homes.

While the applications of fluid delivery and distribution systems are many and varied, most fluid delivery and distribution systems generally include incompressible or compressible fluids in the forms of liquids or gases that are pressurized, depressurized, pumped, compressed, expanded, evaporated, condensed, combined, separated, filtered, heated, cooled, or stored. The fluids of such fluid delivery and distribution systems are also typically moved, conveyed, transported, routed, directed, or delivered by and through a network of pipes, hoses, tubes, conduits, ducts, couplers, unions, connectors, elbows, tees, wyes, reducers, crosses, nipples, traps, caps, plugs, and similar devices (referred to herein, collectively, as "fittings") between system devices or equipment that act on, utilize, or act in response to the fluids (referred to herein, collectively, as "components"). Some components perform a function on the fluid such as, but not limited to, pressurizing, depressurizing, pumping, limiting the flow of, stopping the flow of, directing the flow of, compressing, expanding, evaporating, condensing, combining, mixing, separating, filtering, heating, cooling, or storing the fluid. Thus, such components include, without limitation, pumps, compressors, turbines, valves, evaporators, condensers, dryers, mixers, filters, heat exchangers, heaters, coolers, and chillers. Other components perform a function in response to receiving the fluid such as, without limitation, extending, contracting, translating, rotating, or moving. Therefore, such other components include, without limitation, actuators and motors. Additionally, in many fluid delivery and distribution systems of manufacturing plants, a varied assortment of instrumentation and sensors are used in connection with various nearby controllers to control and manage the systems' operation. Such instrumentation and sensors generally measure characteristics of the fluid that are inputs to the controllers, that are important to the system's control, operation, or maintenance, and that may include characteristics such as pressure, temperature, flow rate, level, concentration, pH, salinity, viscosity, or turbidity.

With recent trends in digitalization and the Internet of Things (IoT), many components of fluid delivery and distribution systems now have embedded instrumentation, sensors, and/or electronics, thereby turning such components into "intelligent components" (or "smart components") that enable better local control, diagnostics, and prognostics. In addition to fluid characteristics, such instrumentation and sensors often measure parameters such as shaft speed, swash plate angle, spool displacement, and cylinder displacement. However, such instrumentation, sensors, and electronics are not inexpensive and, for at least this reason, intelligence is typically built into only certain components such as pumps, compressors, valves and filters, and is not built into other components. Therefore, the intelligence is only local to the intelligent component and does not extend system-wide. Further, since intelligent components are relatively expensive as compared to unintelligent counterparts, the replacement of unintelligent components with intelligent components is often cost prohibitive. Because the intelligence of intelligent components is only local and because it is often cost prohibitive to replace existing unintelligent components with intelligent components, fluid delivery and distribution systems frequently have insufficient intelligence to address system-wide concerns such as overall system uptime and predictive service requirements.

Therefore, there is a need for fluid delivery and distribution systems having sufficient intelligence to address system-wide concerns, and that solve these and other difficulties, problems, and shortcomings of present fluid delivery and distribution systems.

SUMMARY

Broadly described, the present invention comprises a hybrid, wireless sensor network architecture for fluid delivery and distribution systems, including apparatuses and methods, for monitoring, operating, controlling, or maintaining such systems. In one inventive aspect, the hybrid, wireless sensor network architecture comprises intelligent fittings locatable at virtually any location within a fluid delivery and distribution system that are adapted to make measurements of characteristics of a fluid passing therethrough or of component parameters, and to wireless communicate the measurements to a controller for use in controlling operation of the fluid delivery and distribution system or components thereof, in prognosis to detect and identify components or fittings requiring maintenance and to prevent failures, and in diagnosis to determine the causes of component or fitting failures. In another inventive aspect, the hybrid, wireless sensor network architecture comprises intelligent fittings adapted to, essentially, convert existing unintelligent components of a fluid delivery and distribution system into intelligent components at a cost lower than that required to replace existing unintelligent components with intelligent components. In still another inventive aspect, the hybrid, wireless sensor network architecture comprises intelligent fittings adapted to supplement data representative of characteristics of a fluid of a fluid delivery and distribution system or component parameters received from existing intelligent components of the fluid delivery and distribution system. In yet another inventive aspect, the hybrid, wireless sensor network architecture comprises a digital twin adapted to logically model and embody the topology of a hybrid, wireless sensor network of a fluid delivery and distribution system, including, without limitation, the locations of intelligent fittings relative to intelligent components, unintelligent components, and unintelligent fittings.

In one aspect, the disclosed technology relates to a hybrid, wireless sensor network architecture for a fluid delivery and distribution system, the architecture comprising: a first component adapted to perform one or more functions on a fluid or in response to receiving a fluid; a second component adapted to perform one or more functions on the fluid or in response to receiving the fluid; and an intelligent fitting connected for fluid communication between the first component and the second component; the intelligent fitting being adapted to communicate the fluid between the first component and the second component; the intelligent fitting having a sensor adapted to perform measurements of a characteristic of the fluid and to wirelessly communicate data representative of the measurements via a communication network.

In some examples, the first component comprises an intelligent component and the second component comprises an unintelligent component. In such examples, the intelligent fitting is connected for fluid communication directly to the second component.

In some examples, the first component comprises an unintelligent component and the second component comprises an intelligent component. In such examples, the intelligent fitting is connected for fluid communication directly to the first component.

In some examples, the first component comprises an intelligent component and the second active component comprises an intelligent component.

In some examples, the intelligent fitting comprises a connector fitting. In some examples, the intelligent fitting comprises an elbow fitting. In some examples, the intelligent fitting comprises a tee fitting. In some examples, the intelligent fitting comprises a wye fitting. In some examples, the intelligent fitting comprises a coupler fitting.

In some examples, the communication network comprises a local area network. In some examples, the communication network comprises a broadband network. In some examples, the communication network comprises a personal area network.

In some examples, the characteristic of the fluid measurable by the intelligent fitting comprises the temperature of the fluid. In some examples, the characteristic of the fluid measurable by the intelligent fitting comprises the pressure of the fluid. In some examples, the characteristic of the fluid measurable by the intelligent fitting comprises the flow rate of the fluid. In some examples, the characteristic of the fluid measurable by the fitting comprises the level of the fluid.

In some examples, at least one of the first component or the second component comprises a pump. In some examples, at least one of the first component or the second component comprises a filter. In some examples, at least one of the first component or the second component comprises an actuator. In some examples, at least one of the first component or the second component comprises a compressor.

In some examples, the fluid comprises hydraulic fluid. In some examples, the fluid comprises a fuel. In some examples, the fluid comprises water.

In another aspect, the disclosed technology relates to a hybrid, wireless sensor network architecture for a fluid delivery and distribution system, the architecture comprising: a first component adapted to perform one or more functions on a fluid or in response to receiving a fluid; a second component adapted to perform one or more functions on the fluid or in response to receiving the fluid; an intelligent fitting connected for fluid communication between the first component and the second component, the intelligent fitting being adapted to communicate the fluid between the first component and the second component, the intelligent fitting having a sensor adapted to perform measurements of a characteristic of the fluid and to wirelessly communicate data representative of the measurements via a communication network, and a controller adapted to receive data representative of the measurements of the characteristic of the fluid communicated wirelessly from the intelligent fitting.

In some examples, the controller is further adapted to control operation of at least one of the first component or the second component based at least in part on received data representative of the measurements of the characteristic of the fluid. In some examples, the controller is further adapted to predict required maintenance for at least one of the first component or the second component based at least in part on received data representative of the measurements of the characteristic of the fluid. In some examples, the controller is further adapted to aid in diagnosing failure of at least one of the first component or the second component based at least in part on received data representative of the measurements of the characteristic of the fluid. In some examples, the controller is further adapted to use received data representative of the measurements of the characteristic of the fluid to emulate operation of the first component or the second component via a digital twin.

In some examples, the controller is physically located proximate at least one of the first component or the second component. In some examples, the controller is logically located in the Internet cloud. In some examples, the controller is physically located at the same facility as at least one of the first component or the second component.

In another aspect, the disclosed technology relates to a hybrid, wireless sensor network architecture for a fluid delivery and distribution system, the architecture comprising: one or more intelligent components each adapted to perform one or more functions on a fluid or in response to receiving a fluid, the one or more intelligent components having a sensor module adapted to perform measurements of a characteristic of the fluid and to wirelessly communicate data representative of the measurements via a communication network; one or more unintelligent components each adapted to perform one or more functions on the fluid or in response to receiving the fluid; and at least one intelligent fitting connected between an intelligent component and an unintelligent component, the at least one intelligent fitting being adapted to communicate the fluid between the intelligent component and the unintelligent component, the at least one intelligent fitting having a sensor module adapted to perform measurements of a characteristic of the fluid and to wirelessly communicate data representative of the measurement via a communication network.

In some examples, the architecture further comprises a controller adapted to receive data representative of measurements of one or more characteristics of the fluid communicated wirelessly from the at least one intelligent fitting and the one or more intelligent components. In some examples, the controller is operative, based at least in part on the received data, to control operation of the one or more intelligent components and the one or more unintelligent components. In some examples, the controller is operative to model operation of the one or more intelligent components and the one or more unintelligent components using digital twins in connection with the received data.

In some examples, the sensor module of the at least one intelligent fitting is adapted to derive electrical power for operation by harvesting energy from the fluid.

In some examples, the communication network has a star topology. In some examples, the communication network has a mesh topology.

Other inventive aspects, advantages and benefits of the present invention may become apparent upon reading and understanding the present specification when taken in conjunction with the appended drawings.

DETAILED DESCRIPTION OF EXAMPLE EMBODIMENTS

Figure 1:
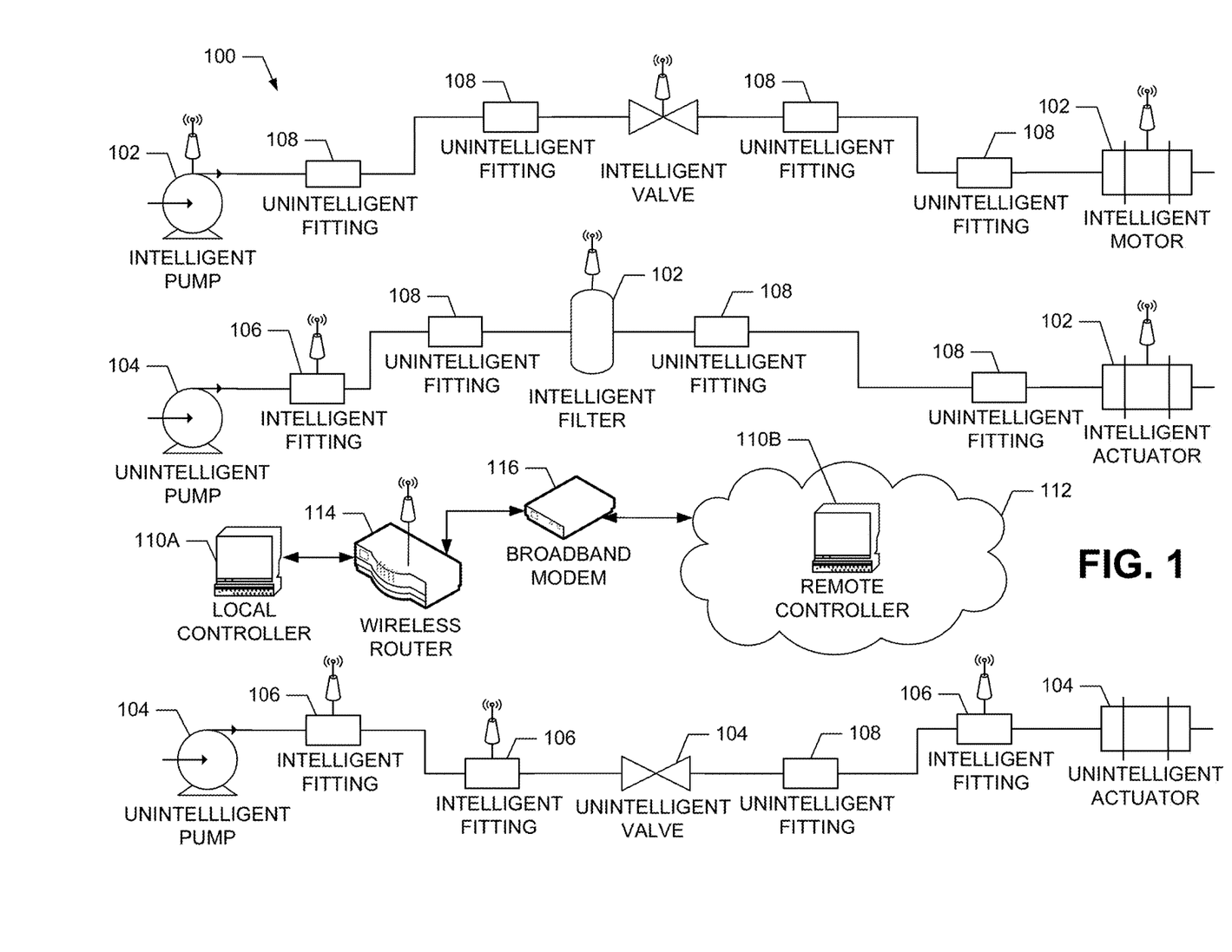
FIG. 1 displays a schematic view of a hybrid wireless sensor network architecture for a fluid delivery and distribution system in accordance with an example embodiment of the present invention.

Referring now to the drawings in which like elements are identified by like numerals throughout the several views, FIG. 1 displays a schematic view of a hybrid wireless sensor network architecture 100 for a fluid delivery and distribution system in accordance with an example embodiment of the present invention. The hybrid wireless sensor network architecture 100 (also sometimes referred to herein as the "architecture 100") may be employed with a wide variety of fluid delivery and distribution systems and provides improved management, control, and operation of such systems, including, but not limited to, addressing of system-wide concerns such as overall system control and uptime, predictive service or maintenance needs, and diagnosis and prevention of system failures. The architecture 100 may be used with a wide variety of fluid delivery and distribution systems including those found in, but not limited to, industrial or commercial plants and facilities such as petrochemical plants, refineries, chemical plants, pulp and paper mills, manufacturing plants, water treatment plants, hospitals, and buildings, and in residences, elevators, aircraft, construction and other heavy equipment, aircraft, ships, and vehicles.

The hybrid wireless sensor network architecture 100 may be used with systems delivering and distributing a wide variety of fluids. As used herein, the term "fluids" includes all incompressible and compressible fluids in liquid and gaseous forms such as, but not limited to, hydraulic fluid, oil, gasoline, transmission fluid, water, and other liquids, and air, oxygen, nitrogen, carbon dioxide, and other gases. The architecture 100 may be utilized and employed with new fluid delivery and distribution systems and existing fluid delivery and distribution systems by retrofitting. The hybrid wireless sensor network architecture 100 enables the measurement of various characteristics of the fluids of a fluid delivery and distribution system at virtually any location in the system and the wireless communication and collection of data corresponding to such measurements. Such characteristics include, but are not limited to, pressure, temperature, flow rate, level, concentration, pH, salinity, viscosity, or turbidity. The architecture 100 also enables the measurement and wireless communication and collection of data representative of component-related parameters such as, without limitation, shaft speed, swash plate angle, spool displacement, and cylinder displacement. Once collected, the data may be used, for example and without limitation, to control overall operation of the system and individual components thereof, to determine if a particular component or fitting of the system is in need of maintenance or servicing, and to aid in diagnosing the reasons for failure of a particular component or fitting of the system.

As illustrated in FIG. 1, the hybrid wireless sensor network architecture 100 comprises intelligent components 102 and unintelligent components 104. As described above, the intelligent components 102 differ from the unintelligent components 104 in that the intelligent components 102 have embedded instrumentation, sensor modules, wireless communication modules, control modules, and other electronics that are not present in the unintelligent components 104. Some specific examples of intelligent components 102 include, without limitation: valves with embedded pressure sensors that measure supply pressure, tank pressure, port pressures, or spool displacement; e-pumps having embedded sensors that measure shaft speed and swash plate angle; and, smart actuators including a cylinder with a displacement sensor to measure the distance moved by the cylinder's ram and/or a port pressure sensor to measure the fluid pressure at the port.

The hybrid wireless sensor network architecture 100 also comprises intelligent fittings 106 and unintelligent fittings 108. The intelligent fittings 106 include fittings that are configured, according to the example embodiments described herein, with at least sensor modules and wireless communication modules that are electrically connected for the communication of signals and data therebetween. The sensor modules are adapted to make measurements of one or more characteristics of a fluid present within or traveling through the intelligent fittings 106 and the wireless communication modules are adapted to wirelessly communicate data representative of the measurements to a controller or other device. According to the example embodiments, a variety of protocols may be used for such wireless communication including, but not limited to, WiFi (various 802.11 protocols), proprietary radio frequency (RF), ISA 100, Bluetooth, BLT, IEEE 802.15.4, Zigbee, WirelessHART, and other similar and non-similar protocols. The wireless communication network topology for such wireless communications may be star, mesh, or other topologies. The sensor and wireless communication modules may be powered by batteries, line power, energy harvesting, or wirelessly.

Energy harvesting may, depending on the amount of power required by the sensor and wireless communication modules, produce electrical power from vibrations, turbines, positive displacement devices, temperature differentials, and other devices. Similar to the unintelligent components 104, the unintelligent fittings 108 do not include sensor or wireless communication modules and, hence, have no sensing or wireless communication capability.

Intelligent fittings 106 may be positioned at any locations within the fluid delivery and distribution system where measurements of fluid characteristics or component operating parameters are helpful in controlling the system's operation, predicting maintenance needs, and detecting, preventing, or diagnosing failures. For example, intelligent fittings 106 may be directly connected to the inlet and outlet ports of an unintelligent component 104 to provide measurements of fluid inlet and outlet pressures, temperatures, and flow rates, thereby essentially converting the unintelligent component 104 into an intelligent component 102 with less cost and without replacing the unintelligent component 104 with an intelligent component 102. In another example, an intelligent fitting 106 may be coupled between unintelligent fittings 108 in the form of pipes or hoses to monitor the flow rate of the fluid transported by the pipes or hoses and detect possible leaks from the pipes or hoses.

Additionally, the hybrid wireless sensor network architecture 100 comprises one or more controllers 110 configured to receive data from the intelligent components 102 and intelligent fittings 106 and to utilize the received data to control or modify operation of the fluid delivery and distribution system and/or operation of the intelligent components 102, to predict or identify intelligent or unintelligent components 102, 104 needing immediate or future maintenance, and to diagnose the causes of failures of the intelligent components 102, unintelligent components 104, intelligent fittings 106, or unintelligent fittings 108. The controllers 110 may include one or more local or remote controllers 110A, 110B. The local controllers 110A may be physically located near the intelligent components 102 under control or distant from the intelligent components 102, but yet on-site at the same plant or facility as the intelligent components 102. The remote controllers 110B may be located physically in other geographic areas or may be virtually located in the Internet cloud 112. Depending on the form and protocols of wireless communication used between the intelligent components 102, intelligent fittings 106, and controllers 110, the hybrid wireless sensor network architecture 100 may further comprise one or more wireless routers 114, broadband modems 116, or other telecommunication infrastructure devices.

In addition, the hybrid wireless sensor network architecture 100 comprises a digital twin 120 (or digital model) of a physical hybrid wireless sensor network that digitally represents and corresponds to the topology of the hybrid wireless sensor network. The digital twin 120 enables the placement and locations of the intelligent fittings 106 the hybrid wireless sensor network to be optimized in order to capitalize on the functionality provided by the architecture 100. Once created, the digital twin 120 may be downloaded to the controllers 110 or other management system that coordinates operation of the intelligent components 102 and intelligent fittings 106.

Figure 2:
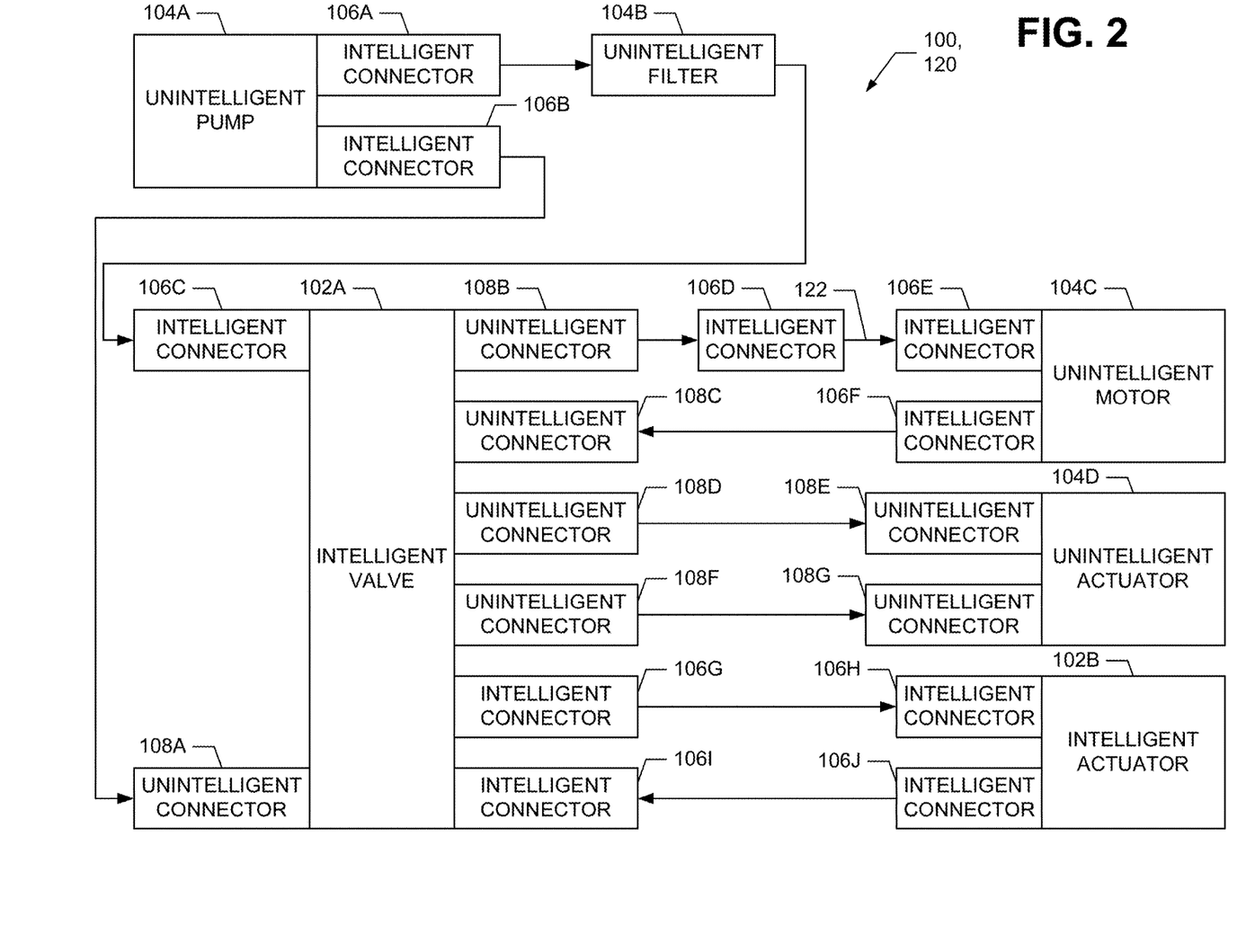
FIG. 2 displays a sample digital twin of the hybrid wireless sensor network architecture that embodies the topology of a hybrid wireless sensor network of a hydraulic fluid delivery and distribution system.

FIG. 2 displays a sample digital twin 120 of the hybrid wireless sensor network architecture 100 that embodies the topology of a hybrid wireless sensor network of a hydraulic fluid delivery and distribution system. The hybrid wireless sensor network and, hence, the digital twin 120 includes unintelligent pump 104A, unintelligent filter 104B, intelligent valve 102A, unintelligent motor 104C, unintelligent actuator 104D, and intelligent actuator 102B. The hybrid wireless sensor network and the digital twin 120 also include intelligent connectors 106A-J and unintelligent connectors 108A-G. In FIGS. 3-8, portions of the digital twin 120 and hybrid wireless sensor network are isolated to illustrate the many ways in which the intelligent fittings 106 and hybrid wireless sensor network architecture 100 may be used for control, diagnostics, or prognostics.

Figure 3:
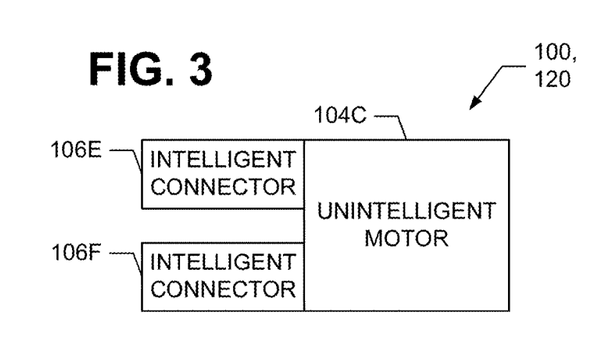
FIG. 3 displays a first portion of the sample digital twin of FIG. 2 in isolation to illustrate a use of intelligent fittings.

In FIG. 3, intelligent fittings 106 in the form of intelligent connectors 106E, 106F are directly connected to the inlet and outlet ports of unintelligent motor 104C to measure and communicate data representative of pressures and flow rates. In such configuration, the upstream and downstream pressures may be used by a controller to calculate the force or torque of the motor. The frequency spectrum of the upstream and downstream pressure signals may be analyzed to detect motor vibration and early wear out. Additionally, using the flow rate measurements, a controller may calculate the amount of leakage and compare the calculated amount to an allowable leakage threshold. If the leakage is above the leakage threshold, a warning may be issued.

Figure 4:
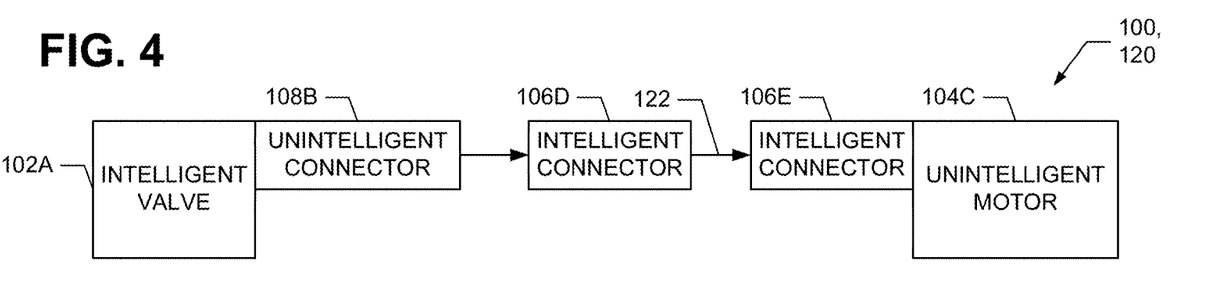
FIG. 4 displays a second portion of the sample digital twin of FIG. 2 in isolation to illustrate a use of intelligent fittings.

In FIG. 4, intelligent fittings 106 in the form of intelligent connectors 106D, 106E are connected between intelligent valve 102A and unintelligent motor 104C to prevent or detect failure of a critically important hose 122. The intelligent connectors 106D, 106E measure temperature, pressure and flow rate of the fluid passing through the hose 122. Before the hose 122 fails, the signatures of the upstream and downstream pressure signals will change, indicating degradation of the hose 122. If the hose 122 fails and leaks, the difference in the flow rates at intelligent connectors 106D, 106E may be used for detection of the failure and allows the flow of fluid through the hose 122 to be shut off at intelligent valve 106A or allows the entire fluid delivery and distribution system to be shutdown.

Figure 5:
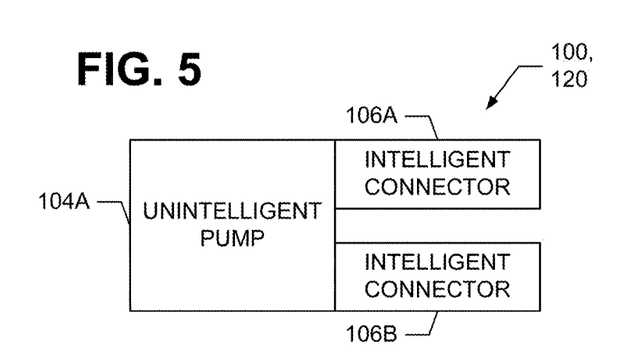
FIG. 5 displays a third portion of the sample digital twin of FIG. 2 in isolation to illustrate a use of intelligent fittings.

In FIG. 5, intelligent fittings 106 in the form of intelligent connectors 106A, 106B are connected, respectively, to the inlet and outlet ports of unintelligent pump 104A and are used to control operation of the unintelligent pump 104A and to detect wear and predict a possible failure of the pump. The intelligent connectors 106A, 106B measure the flow rates and pressures of the fluid entering and leaving the unintelligent pump 104A. Using the flow rate measurements, a closed loop control system may be formed to control the unintelligent pump 104A and deliver the desired fluid flow rate at the pump's outlet. Using the pressure measurements and various algorithms, leakage in one of the pump's pistons may be detected by monitoring pressure ripple.

Figure 6:
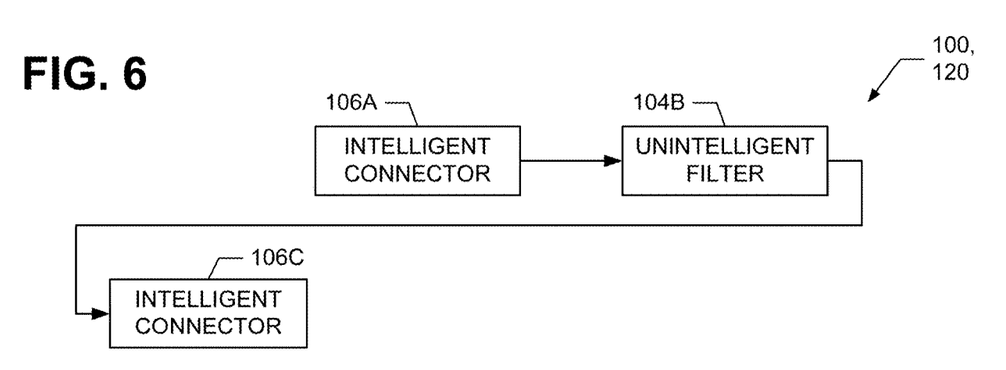
FIG. 6 displays a fourth portion of the sample digital twin of FIG. 2 in isolation to illustrate a use of intelligent fittings.

In FIG. 6, intelligent fittings 106 in the form of intelligent connectors 106A, 106C are located and arranged to monitor pressure drop across unintelligent filter 104B. The pressure drop increases if the contamination level in the fluid increases. When the pressure drop exceeds a certain threshold, a warning may be issued to trigger a service call.

Figure 7:
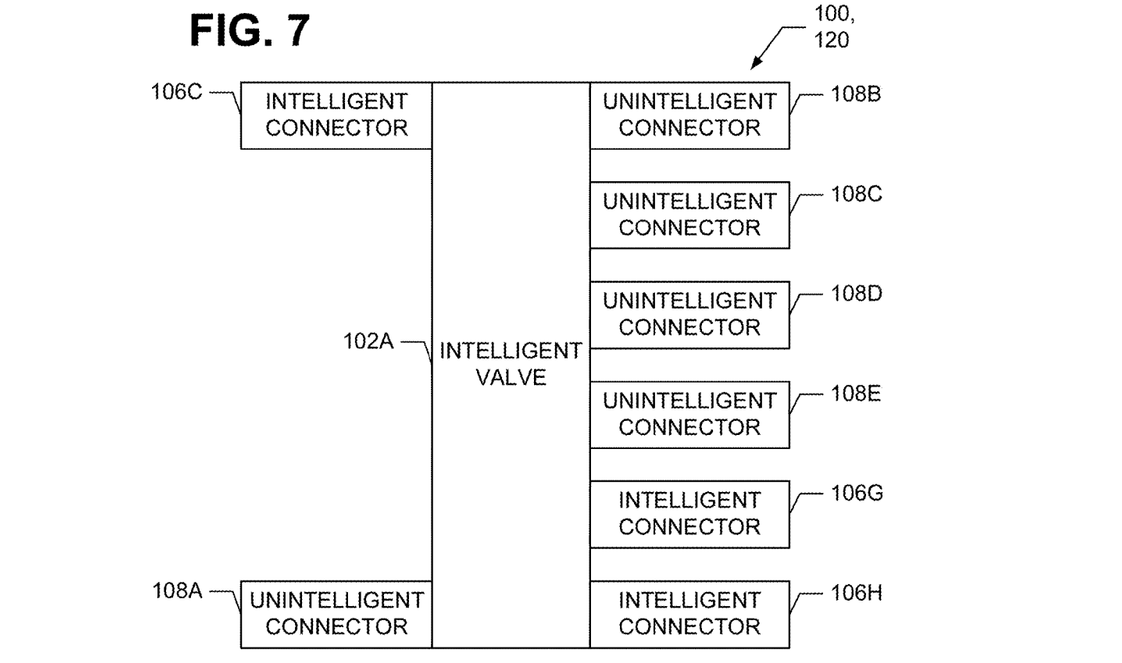
FIG. 7 displays a fifth portion of the sample digital twin of FIG. 2 in isolation to illustrate a use of intelligent fittings.

In FIG. 7, intelligent component 102 in the form of intelligent valve 102A is configured to measure internal port pressures (supply and tank pressures) and spool positions, and to estimate the flow rate for each respective service. Intelligent connector 106C is configured to measure the flow rate of fluid into intelligent valve 102A. Using estimates of the flow rates of fluid to the respective services, the total flow rate of fluid exiting intelligent valve 102A may be estimated and compared to the flow rate into intelligent valve 102A as measured by intelligent connector 106C. A mismatch between the flow rates into and out of intelligent valve 102A indicates possible fluid leakage or other problem, resulting in a warning being issued to request maintenance of intelligent valve 102A. Additionally, intelligent connectors 106G, 106H are configured to measure upstream and downstream service flow rates when intelligent valve 102A is used in a meter-in and meter-out configuration. If the flow rates are different, a problem with intelligent valve 102A exists and the need for maintenance is indicated.

Figure 8:
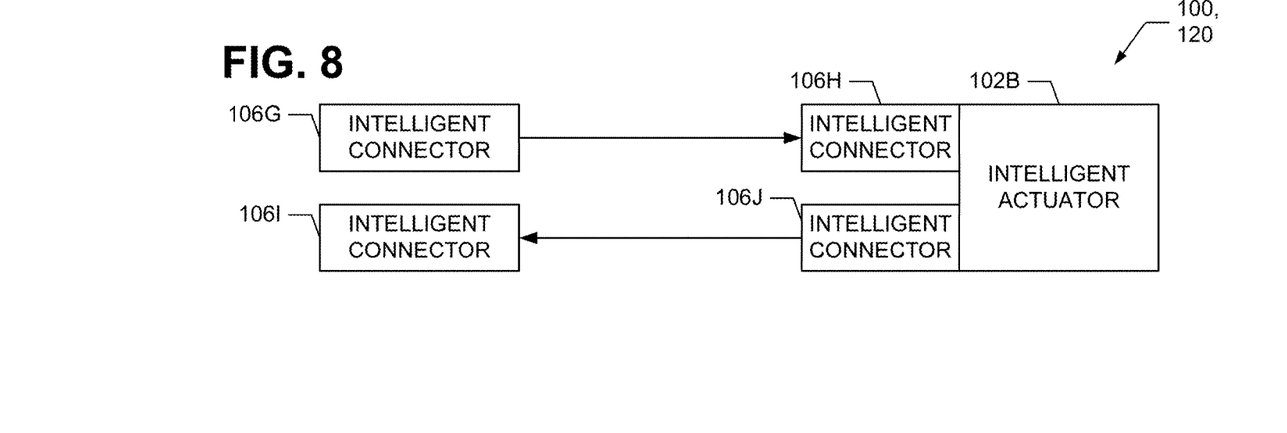
FIG. 8 displays a sixth portion of the sample digital twin of FIG. 2 in isolation to illustrate a use of intelligent fittings.

In FIG. 8, intelligent fittings 106 in the form of intelligent connectors 106G, 106H and intelligent connectors 106I, 106J are configured to measure fluid flow rate, pressure and temperature. Using the flow rate measurements received from intelligent connectors 106G, 106H, a controller may evaluate the condition of a hose extending therebetween. Similarly, flow rate measurements received from intelligent connectors 106I, 106J may be used by a controller to evaluate the condition of a hose therebetween. Also, using data received from intelligent connectors 106H, 106J and from intelligent actuator 102B, a controller may estimate cylinder force and cylinder leakage resulting from seal wear, and monitor cylinder behavioral changes in friction and stiction.

Whereas the present invention has been described in detail above with respect to example embodiments thereof, it should be appreciated that variations and modifications might be effected within the spirit and scope of the present invention.

What is claimed is:

1. A hybrid, wireless sensor network architecture for a fluid delivery and distribution system, said architecture comprising:
   a first component adapted to perform one or more functions on a fluid or in response to receiving a fluid;
   a second component adapted to perform one or more functions on the fluid or in response to receiving the fluid;
   a conduit distributing the fluid between the first and second components;
   first and second intelligent fittings each connected to the conduit at locations between said first component and said second component, said first and second intelligent fittings each having a sensor adapted to perform measurements of a characteristic of the fluid distribution between the first and second components, and to wirelessly communicate data representative of the measurements via a communication network; and
   a controller wirelessly receiving the data representative of the measurements from the communication network, the controller controlling an operation of at least one of the first and second components to shut off the fluid distribution between the first and second components when the data representative of the measurements indicates degradation of the conduit.

2. The hybrid, wireless sensor network architecture of claim 1, wherein said first component comprises an intelligent component and said second component comprises an unintelligent component.

3. The hybrid, wireless sensor network architecture of claim 2, wherein the second intelligent fitting is connected directly to the second component.

4. The hybrid, wireless sensor network architecture of claim 1, wherein said first component comprises an unintelligent component and said second component comprises an intelligent component.

5. The hybrid, wireless sensor network architecture of claim 4, wherein the first intelligent fitting is connected directly to the first component.

6. The hybrid, wireless sensor network architecture of claim 1, wherein said first component comprises an intelligent component and said second component comprises an intelligent component.

7. The hybrid, wireless sensor network architecture of claim 1, wherein said first and second intelligent fittings comprise a connector fitting, an elbow fitting, a tee fitting, a wye fitting, or a coupler fitting.

8. The hybrid, wireless sensor network architecture of claim 1, wherein said communication network comprises a local area network, a broadband network, or a personal area network.

9. The hybrid, wireless sensor network architecture of claim 1, wherein the characteristic of the fluid measurable by said first and second intelligent fittings comprises temperature of the fluid, pressure of the fluid, flow rate of the fluid, or level of the fluid.

10. The hybrid, wireless sensor network architecture of claim 1, wherein at least one of said first component or said second component comprises a pump, a filter, an actuator or a compressor.

11. The hybrid, wireless sensor network architecture of claim 1, wherein the fluid comprises hydraulic fluid, a fuel or water.

12. A hybrid, wireless sensor network architecture for a fluid delivery and distribution system, said architecture comprising:
   a first component adapted to perform one or more functions on a fluid or in response to receiving a fluid;
   a second component adapted to perform one or more functions on the fluid or in response to receiving the fluid;
   an intelligent fitting connected for fluid communication between said first component and said second component, said intelligent fitting being adapted to communicate the fluid between said first component and said second component, said intelligent fitting having a sensor adapted to perform measurements of a characteristic of the fluid and to wirelessly communicate data representative of the measurements via a communication network; and
   a controller adapted to receive data representative of the measurements of the characteristic of the fluid communicated wirelessly from said intelligent fitting, said controller further adapted to use the data representative of the measurements of the characteristic of the fluid to emulate operation of said first component or said second component via a digital twin.

13. The hybrid, wireless sensor network architecture of claim 12, wherein said controller is further adapted to control operation of at least one of said first component or said second component based at least in part on received data representative of the measurements of the characteristic of the fluid.

14. The hybrid, wireless sensor network architecture of claim 12, wherein said controller is further adapted to predict required maintenance for at least one of said first component or said second component based at least in part on received data representative of the measurements of the characteristic of the fluid.

15. A hybrid, wireless sensor network architecture for a fluid delivery and distribution system, said architecture comprising:
   one or more intelligent components each adapted to perform one or more functions on a fluid or in response to receiving a fluid, said one or more intelligent components having a sensor module adapted to perform measurements of a characteristic of the fluid and to wirelessly communicate data representative of the measurements via a communication network;

one or more unintelligent components each adapted to perform one or more functions on the fluid or in response to receiving the fluid;

a conduit distributing the fluid between the one or more intelligent components and the one or more unintelligent components;

at least one intelligent fitting connected to the conduit between an intelligent component and an unintelligent component, said at least one intelligent fitting being adapted to communicate the fluid between said intelligent component and said unintelligent component, said at least one intelligent fitting having a sensor module adapted to perform measurements of a characteristic of the fluid and to wirelessly communicate data representative of the measurements performed by the sensor module of the at least one intelligent fitting via the communication network; and a controller adapted to wirelessly receive the data representative of the measurements from the at least one intelligent fitting and said one or more intelligent components, and the controller controlling an operation of the one or more intelligent components or one or more unintelligent components to shut off the fluid distribution between the one or more intelligent components and the one or more unintelligent components when the data representative of the measurements indicates degradation of the conduit.

16. The hybrid, wireless sensor network architecture of claim 15, wherein said controller is operative to model operation of said one or more intelligent components and said one or more unintelligent components using digital twins in connection with said received data.

17. The hybrid, wireless sensor network architecture of claim 15, wherein said sensor module of said at least one intelligent fitting is adapted to derive electrical power for operation by harvesting energy from the fluid.

* * * * *